United States Patent [19]

Powell, Jr.

[11] Patent Number: 4,769,137
[45] Date of Patent: Sep. 6, 1988

[54] MEANS FOR CHLORINATION OF SWIMMING POOLS

[76] Inventor: Jonathan S. Powell, Jr., 5094 Tip Top Rd., Mariposa, Calif. 95338

[21] Appl. No.: 52,782

[22] Filed: May 21, 1987

Related U.S. Application Data

[63] Continuation-in-part of Ser. No. 881,457, Jul. 2, 1986, Pat. No. 4,673,513.

[51] Int. Cl.⁴ .................. B67D 5/00; G04C 23/00
[52] U.S. Cl. .................. 210/139; 210/169; 210/198.1; 222/644; 222/553
[58] Field of Search .................. 210/753–756, 210/101, 139, 140, 169, 205, 206, 198.1, 138; 222/639, 553, 644, 651; 422/256, 261

[56] References Cited

U.S. PATENT DOCUMENTS

| | | | |
|---|---|---|---|
| 2,660,336 | 11/1953 | Coffey et al. | 222/644 |
| 3,123,554 | 3/1964 | Murray . | |
| 3,368,683 | 2/1968 | Rak | 222/639 |
| 3,708,068 | 1/1973 | Tischler | 210/140 |
| 3,804,253 | 4/1974 | Wellman et al. | 210/169 |
| 3,874,412 | 4/1975 | Fleckenstein et al. | 210/140 |
| 3,976,101 | 8/1976 | Bassett | 210/138 |
| 4,115,263 | 9/1978 | James . | |
| 4,363,728 | 12/1982 | Guglielmi et al. . | |
| 4,389,318 | 6/1983 | Wojtowicz . | |
| 4,490,249 | 12/1984 | Seal | 210/140 |
| 4,614,595 | 9/1986 | Azzarella et al. . | |

Primary Examiner—Benoit Castel
Assistant Examiner—Richard D. Jordan
Attorney, Agent, or Firm—Duane C. Bowen

[57] ABSTRACT

A system to chlorinate swimming pool water including one or more buckets containing sodium hypochlorite solution. The valve having a stationary part with a downwardly open cavity and a rotatable part rotatably mounted in the cavity. The stationary part having multiple ports and the rotatable part having a mating through passage. The ports being interposed in a line from the bucket to a swimming pool water recirculating pump so that flow of the sodium hypochlorite solution from the bucket to the pump only occurs when the through passage registers with the diametrically opposed ports. A battery-powered clock motor and reduction gearing connected to the clock motor and to the rotatable part and the reduction gearing rotating the rotatable part 180° to open flow of sodium hypochlorite solution from the bucket to the pump periodically, so that the pool can be automatically chlorinated sometimes and a service person can chlorinate the pool with gaseous chlorine or sodium hypochlorite on intervening occasions. The valve is mounted on the lid of a plastic container and the clock motor and reduction gearing aredisposed in the container. A float valve in the bottom of the bucket with an air-trapping cap acting as a valve closure maintaining an upper position until the level of the sodium hypochlorite solution in the bucket reaches a low level.

11 Claims, 4 Drawing Sheets

MEANS FOR CHLORINATION OF SWIMMING POOLS

BRIEF SUMMARY OF THE INVENTION

BACKGROUND AND OBJECTIVES

This application is a continuation-in-part of my prior patent application Ser. No. 881,457, now U.S Pat. No. 4,673,513, filed 7/2/86, entitled "Means and Process for Chlorination of Swimming Pools".

My invention relates to a means for chlorination of swimming pools using elemental chlorine, cyanuric acid, and sodium hypochlorite.

I became involved in the conception, development and commercialization of the process and equipment for chlorinating swimming pools using gaseous chlorine and/or sodium hypochlorite and a compound selected from the group consisting of cyanuric acid, ammelide, and their salts. (For convenience in the following specification, I will usually use the expression "cyanuric acid" rather than also listing the other members of the group.)

Cyanuric acid and chlorine combine to prevent rapid hydrolysis of chlorine by sunlight thus requiring less chlorine for swimming pool treatment. Free chlorine in an equilibrium is liberated from the combination as needed to sanitize the pool water. This method was developed and commercialization started in the 1959–1961 period and became known as the Poolchlor System. U.S. Pat. No. 2,988,471, assigned to Food Machinery Corporation, was granted June 13, 1961, and was entitled "Stabilization of Active Chlorine Containing Solutions" and concerned the use of cyanuric acid in treating swimming pools.

When chlorine ($Cl_2$) is injected in pool water, one atom of chlorine with a valence of plus one combines with the cyanuric acid and the other chlorine atom with a valence of minus one forms hydrochloric acid. This hydrochloric acid needs to be neutralized to maintain the pH in the desired range of 7.2 to 8.2. The pool makeup water may contain some alkalinity to help in this neutralization. Some alkalyzer, such as sodium carbonate, frequently has to be added to help neutralize the hydrochloric acid.

The object of my invention includes devising a means using chlorine gas and/or sodium hypochlorite solution, on successive occasions, to recharge the cyanuric acid when pool water becomes depleted with respect to $Cl+$. When chlorine gas is used, some hydrochloric acid is formed which takes care of any excess alkalinity introduced by the makeup water. Sodium hypochlorite has a neutral effect when it is used to add the $Cl+$ to the cyanuric acid in the pool water. If acid is required, the sodium hypochlorite will not supply it. By the proper use of chlorine gas, sodium hypochlorite and/or hydrochloric acid, no additional alkalizer need be added to the pool water, which in the original Poolchlor System causes the problem of the precipitation of calcium carbonate from the pool water. The use of sodium hypochlorite solution according to my means and process lends itself to automatic injection as described in the attached description which is a part of this invention. It is a further objective of my invention to devise a semiautomatic means to add chlorine to pool water (treated by cyanuric acid) so that service personnel need perform pool service less frequently.

Another objective of my invention is to devise economical, reliable equipment to periodically add sodium hypochlorite to the inlet side of a swimming pool recirculating pump. More specifically, it is an objective to devise valve and timing means powered by a battery, especially a small battery or energizer such as a "C" battery size, to control when a vessel or vessels containing sodium hypochlorite is connected to the suction side of a pool recirculating pump.

My invention will be best understood, together with additional advantages and objectives thereof, when read with reference to the drawings.

SPECIFIC DESCRIPTION

Figure 9:
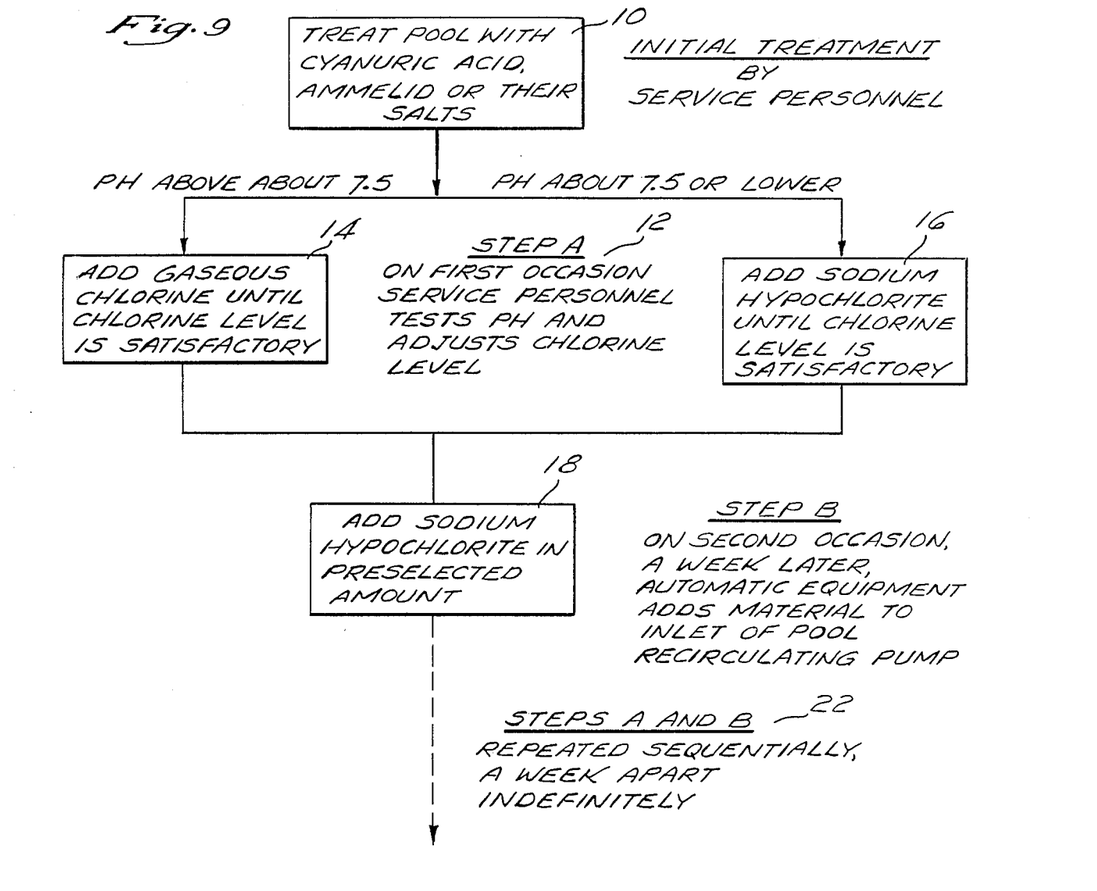
FIG. 9 is a flow diagram showing a specific embodiment of my system for chlorination of a swimming pool.

FIG. 9 diagrams a specific embodiment of a specific embodiment of my system for treating the water of a swimming pool, which includes:

(1) The step 10 of initially having service personnel treat the swimming pool with cyanuric acid.

(2) Step A The step 12, on a first occasion, of having service personnel test the pH of the pool and adjusting the chlorine level
 1. by the step 14 of adding gaseous chlorine if the pH is above about 7.5, or
 2. by the step 16 of adding sodium hypochlorite if the pH is about 7.5 or lower.

(3) Step B The step 18, a second occasion, a week later, of adding sodium hypochlorite in preselected amount, by use of automatic equipment adding the material to the inlet of the pool recirculating pump 20.

(4) Thereafter, the step 22 of alternating steps A and B indefinitely.

I will now review the process in more detail.

The quantities mentioned herein are considered optimum. Other quantities than those cited could be used to carry out the process, but it is believed the treatment would suffer in quality and/or would be less economical.

The quantities of chlorine, sodium hypochlorite, and cyanuric acid used are based on a standard-sized swimming pool containing 20,000 gallons of water. For pools containing more of less water than this, the quantities of chemicals used would change generally proportionately. One pound of one of the chemicals added to the standard-sized pool gives a concentration of 6 ppm "by weight".

Initially, step 10, cyanuric acid or its sodium salt (making allowance for the sodium content) is added to the swimming pool to give preferably a concentration of 100 ppm and the level preferably is maintained thereafter between 75 and 100 ppm. In U.S. Pat. No. 2,988,471, above cited, other concentrations are set forth but my experience indicates the concentrations just mentioned are preferable. Cyanuric acid is not consumed in the process but can be lost when water is removed from the pool by splashing, a leak in the pool, backwashing the filter, etc. Some cyanuric acid may be lost by combining with foreign materials in the pool water to form insoluble compounds that are filtered out of the water. Some cyanuric acid may be lost by absorption by filtering materials such as diatomaceous earth. The average loss of cyanuric acid for a standard pool is about 12 lbs. per year so a makeup of about 12 lbs. of cyanuric acid per year is required after the initial addition.

To maintain the cyanuric acid level within the range of 75 to 100 ppm, the water is tested periodically for cyanuric acid using the standard melamine test. Pool water and melamine solution added together in the test proportions gives a turbid solution. A measure visually of the opaqueness of this solution is related to the cyanuric acid concentration. When the cyanuric acid concentration reduces to about 75 ppm, cyanuric acid is added in an amount to increase the concentration to about 100 ppm. The test for cyanuric acid can be made with a test kit called The Aquality turbidity test set made by Aquality, Inc., 8938 Mason Ave., Chatsworth, Calif. 91311.

Chlorine is added to sanitize the swimming pool water to give an initial level of preferably 8 ppm. Other parties may use a preferred chlorine concentration different from my preferance of 8 ppm, but that value represents my best thinking and experience on the subject. The chlorine may be added by dissolving in the water of the standard pool 1⅓ lbs of gaseous chlorine or by adding 1⅓ gals. of sodium hypochlorite solution containing the equivalent of one pound of chlorine per gal.

In sanitizing the pool, the pH preferably should be maintained between 7.2 and 8.2. The test for pH is the standard test using phenol red indicator and comparing the color formed with a pool water sample with that of the color standards in the test kit. To sanitize, in adjusting the chlorine level preferably to 8 ppm in Step A (FIG. 9), if the pH is above 7.5, chlorine gas is dissolved in the pool water to increase the chlorine level to 8 ppm. If the pH is 7.5 or lower, sodium hypochlorite solution is added in Step A to increase the chlorine level to preferably 8 ppm. When chlorine gas is added, it forms a little over ½ lb. of HCL as hydrochloric acid for each lb. of chlorine gas dissolved. This lowers the pH by neutralizing the alkalinity introduced by the pool makeup water. When sodium hypochlorite is added, it is essentially neutral adding possibly only a small amount of alkalinity to raise the pH some.

The chlorine in the pool water will last about a week from about the middle of June until about the middle of September in climates having warm to hot summer temperatures. From the middle of September until the middle of June in climates having cool to cold temperatures, the chlorine in the pool water will last two weeks or longer. For convenience, in the FIG. 9 flow chart, for steps 18 and 20, the summer or warm cycle is used, as well as in the specification, but this is to be interpreted as meaning the needed interval whether one week, two weeks, etc. it is usually convenient in commercial practice, to use even one or two week intervals but a ten-day interval, etc. always would be possible. With a five or six day work week, it is convenient to schedule a pool to be serviced always on Monday or Tuesday or Wednesday, etc. At the end of these periods of time a service person must visit the pool and add more chlorine. He will first test the pool water for its residual total chlorine content using a ortho toluidine solution. A standard test kit, such as the Taylor kit, is used (gives both free chlorine and that combined with the cyanuric acid). However, the Taylor kit is designed for low concentrations of chlorine up to about one ppm so only 1/10 the amount of pool water sample is put in the test cell and proportionately diluted ortho toluidine solution is used to fill the cell. The yellow color developed is compared visually in color density to the color standards of the kit for different chlorine concentrations. The concentration of chlorine for the standard that matches the closest is multiplied by ten for the actual total chlorine concentration in the pool water. The difference between this value and 8 is the ppm of chlorine the pool water needs to be increased. For a standard pool 1/6 of a pound of gaseous chlorine or 1/6 of a gal. of sodium hypochlorite is added per ppm of chlorine increase required.

The pH of the pool water, as mentioned above, determines which source of chlorine is used. Since in the summer time a swimming pool needs to be visited twice as frequently as during the rest of the year, double the number of service personnel, trucks, and other equipment is required in the summer which increases the cost of servicing swimming pools during this period between 20 and 30%. The increased frequency of visits by service people also requires hiring and training part-time personnel who are less skilled and give poorer quality of service than regular employees. If servicing of pools could be done regularly on a two weeks schedule year around, the cost savings would be considerable plus the quality of service would be better by having full-time experienced employees. Therefore an important part of the swimming pool treatment system described above is to have the step 18 or B of using an automatic sodium hypochlorite feeder, used at least during the summer season, which will inject into the swimming pool water circulating system a quantity of sodium hypochlorite solution, one week after the service man's visist, sufficient to raise the chlorine level to 8 ppm.

Then the Step A—Step B cycle 22 is followed in which the following week the service man would return and add chlorine gas or sodium hypochlorite solution depending on the pH to raise the chlorine level to 8 ppm. At this time he also would charge the sodium hypochlorite feeder vessel 24 with a quantity of sodium hypochlorite solution to give the same amount of chlorine that he had then added to raise the chlorine level to 8 ppm which would be injected at the end of the following week. The service person would repeat this procedure on each of his beweekly visits.

One design of a feeder is a rotational valve 26 made to rotate one rotation in 28 days by a clock movement (preferably battery powered). Every two weeks an inlet port 27 communicates with a discharge port 29 in valve 26. A tube 31 is connected between the inlet port 27 and valve 28 with a shut-off float 30 in the bottom of container 24 for sodium hypochlorite solution. The discharge port 29 is connected by a tube 33 to a tap on the inlet to the pool's circulating filter pump 20. The rotational valve's inlet port 27 is open to the discharge port 29 long enough to allow all of the sodium hypochlorite solution in container 24 to be sucked into the pool's circulating pump 20 and discharged into the pool. The float valve 28 shuts off when container 24 is empty to prevent air from being sucked into the pool's water circulating system.

It is conventional for swimming pools to be treated with gaseous chlorine and cyanuric acid or with sodium hypochlorite solution and cyanuric acid. In the former system with gaseous chlorine because more hydrochloric acid is produced than is necessary to neutralize the alkalinity of the pool's makeup water, some alkalizer such as sodium carbonate has to be added periodically to keep the pH from going too low. In the latter system with sodium hypochlorite solution the pH of the pool water gradually becomes too high and hydrochloric acid has to be added periodically to lower the pH. In my system of FIG. 9 the two systems are combined and largely eliminate the need to add alkalizers or hydrochloric acid. Because sodium hypchlorite solution lends itself to being injected automatically, the two systems (addition of gaseous chlorine and addition of sodium hypochlorite) can be combined in a manner lowering labor and equipment costs.

The test kits for testing for pH using phenol red indicator and for chlorine using ortho toluidine indicator are combined in one kit called "The Taylor Midget Tester Model A". It is made by the Taylor Chemical Co., Inc., 7300 York Road, Baltimore, Md. 21204.

The lower desirable limit in pool pH is 7.2 because below that level corrosion could occur in metal piping, etc. The upper desirable limit in pool pH is 8.2, not because a higher level is damaging but because at a higher level the chlorine would be less effective in killing algae.

Figure 10:
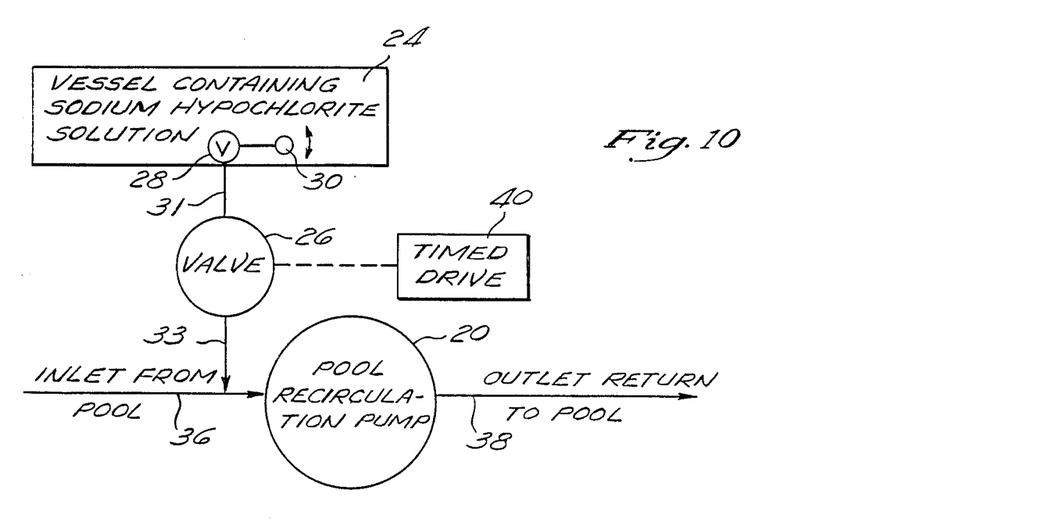
FIG. 10 is a schematical view of equipment for automatically adding sodium hypochlorite to a pool.

A suitable container or vessel 24 is provided for the sodium hypochlorite solution. Gravity feed from vessel 24 could be used but preferably pump 20 is used to suck liquid from vessel 24 by vacuum. Valve 28 shuts off line 31 when vessel 24 empties, by action of float 30, to avoid sucking air into pump 20. The float valve action is symbolized in FIG. 10. FIG. 10 shows that line 33 connects to an inlet line 36 from the pool to pump 20, such as by use of a tee. Pump 20 can be a standard pool recirculating pump drawing water through line 36 from the pool and discharging water back to the pool through line 38. Water may be filtered and/or heated while it is being recirculated. Valve 26 is periodically opened by timed drive 40. A housing 42 provides a protective container for timed drive 40. Valve 26 is mounted on the lid 44 of housing 42. Housing 42 and lid 44 may be formed of metal or plastic but a strong lid is needed as a solid mounting for valve 26 and drive 40. An economical expedient is to use a commercially available plastic container and lid, such as may be used in refrigerator or freezers as quality containers for food. This avoids the expense of producing a special container and lid. The only modification needed is an opening 45 in lid 44 to accommodate a mounting about a drive shaft.

Figures 5, 6, 7, 8:
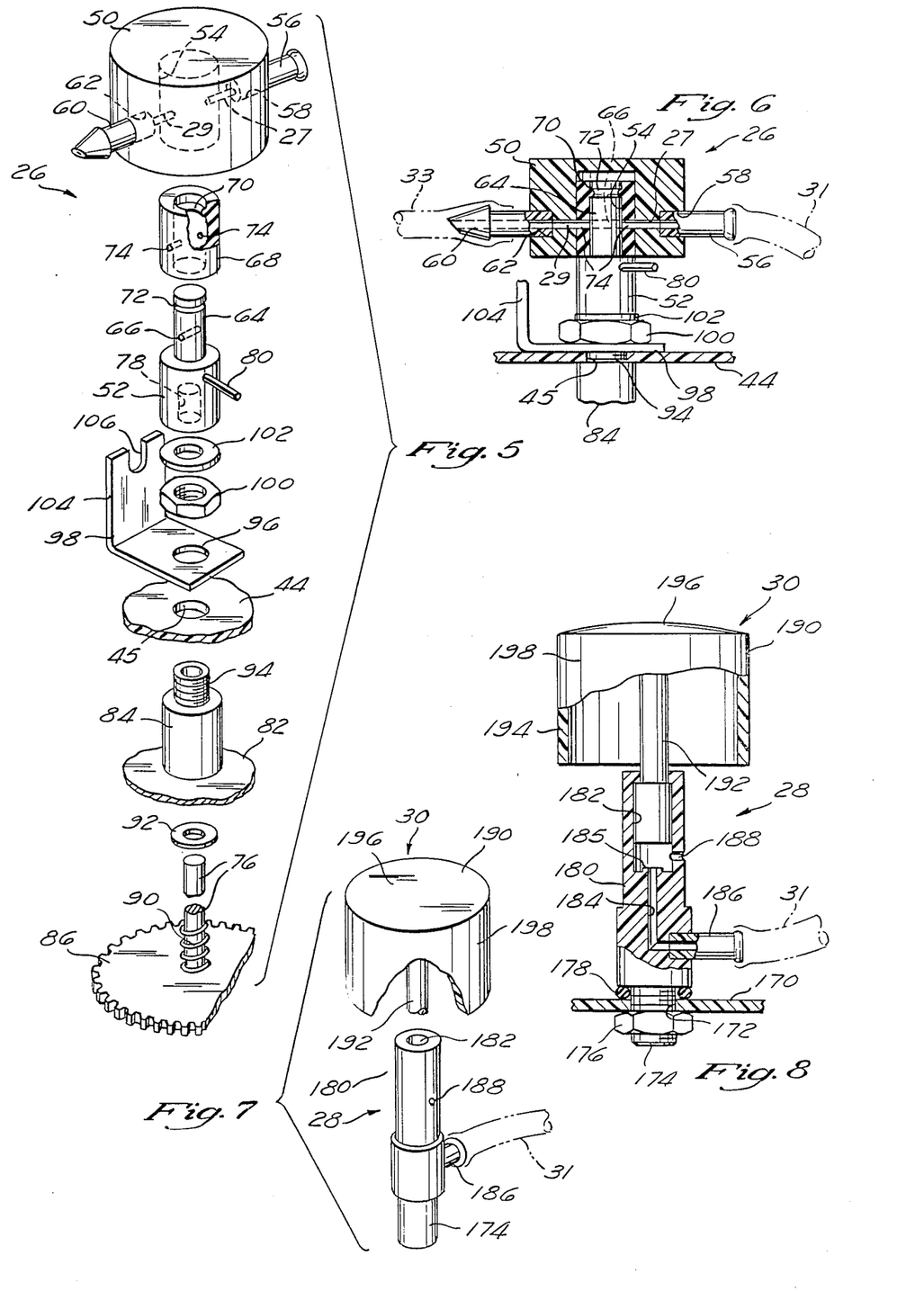
FIG. 5 is an enlarged perspective view, in exploded form, of portions of a control valve mechanism.
FIG. 6 is an enlarged elevational view, partly in section, of portions of the control valve mechanism.
FIG. 7 is an enlarged fragmentary perspective view of a float valve mechanism.
FIG. 8 is an enlarged elevational view, partly in section, of portions of the float valve mechanism.

Valve 26 has an upper stationary part 50 and a lower movable part 52 that rotates relative to stationary part 50 as driven by timed drive 40. Part 50 has a downwardly open cavity 54 of circular cross-section. Inlet port 27 and discharge port 29 are diametrically opposed and lead from the exterior of part 50 to cavity 54. Inlet connector fitting 56 is bonded in a counterbore 58 associated with inlet port 27 and discharge connector fitting 60 is bonded in a counterbore 62 associated with discharge port 29. Fittings 56, 60 will be recognized to be of types used for connection of tubing, i.e., in drip irrigation tubing systems, for example. Fitting 56 is connected to inlet tube 31 and fitting 60 is connected to discharge tube 33.

Movable part 52 has an upstanding boss 64 with a through passage 66 aligning with the diametrically opposed ports 27, 29 twice in each revolution of movable part 52, so that sodium hypochlorite solution will be discharged from storage vessel 24 each time passage 66 aligns with ports 27, 29. An elastomeric sleeve 68 is interposed between boss 64 and the walls of cavity 54. Sleeve 68 is joined to boss 64 to rotate therewith by a stretch fit of sleeve 68 over boss 64 and by an annular bead 70 on the inside of sleeve 68 fitting in an annular groove 72 in boss 64. Sleeve 68 has openings 74 aligning with through passage 66. The purpose of sleeve 68 is to make a good seal between the relatively rotating parts. I prefer to form sleeve 68 of VITON fluroelastomer manufactured by du Pont. I prefer to form parts 50, 52 of PVC or of KYNAR PVDF manufactured by Penwalt. VITON and KYNAR are particularly resistant to the corrosiveness of chlorine in general or sodium hypochlorite solution in particular, which is commonly used as household bleach which indicates its corrosiveness.

Figures 1, 2, 3, 4:
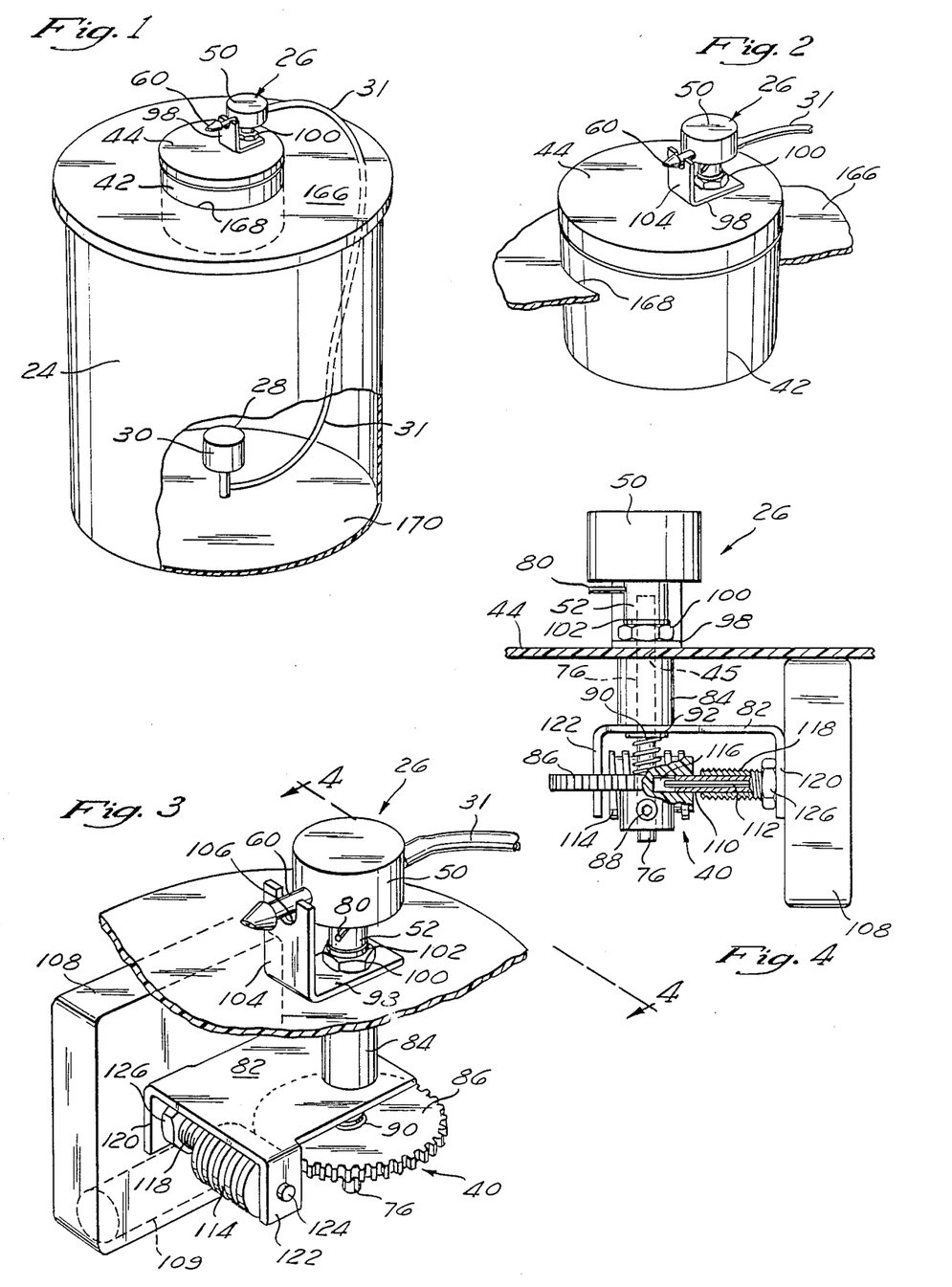
FIG. 1 is a perspective view of a specific embodiment of my apparatus for adding sodium hypochlorite to a pool. A portion is broken away to better show a float valve.
FIG. 2 is an enlarged fragmentary perspective view of portions of the apparatus.
FIG. 3 is a further enlarged fragmentary perspective view of portions of the apparatus.
FIG. 4 is an elevational view, partly in section, taken on line 4—4 of FIG. 3.

A vertical drive shaft 76 has its upper end secured by a press fit inside a bore 78 in movable part 52. The clocked position of part 52 and shaft 76 can be rotatably adjusted by set screw 88 (FIG. 4). A pointer 80 extends laterally from movable part 52 to indicate the clocked position of movable, rotatable part 52.

A bracket 82 supports components of timed drive 40 and is secured to the lower end of a sleeve 84 through which drive shaft 76 extends. Shaft 76 has a spur gear 86 secured to the lower end of shaft 76 by a set screw 88 and a coil compression spring 90 and Teflon washer 92 are interposed on shaft 76 between spur gear 86 and bracket 82 and sleeve 84.

Lid 44 of housing 42 has an opening 45 in which is positioned a reduced diameter, threaded portion 94 of sleeve 84. Reduced diameter portion 94 also extends through an opening 96 in an L-shaped bracket 98 and a nut 100 is secured to reduced diameter portion 94 to secure the assembly together so that timed drive 40 depends from and is supported by lid 44. A Teflon washer 102 is interposed on drive shaft 76 between nut 100 and movable part 52. L-shaped bracket 98 has an upstanding leg 104 with a notch 106 fitting about line 33 and fitting 60 to hold part 50 stationary against rotation.

A helical gear 114 engages spur gear 86 to rotate the same. Clock movement 108 is a standard purchased item. Such clock movements are available to be used by clock manufacturers to power wall or other clocks by batteries. The clock movement used in the prototype of my equipment is powered by an AA-size battery 109. Some clock movements have hour, minute and second outputs (in concentric tubes and spindle) but the clock movement 108 I use has only an hour and a minute output in concentric hour tube and minute spindle 110, 112 and I only connect the hour tube output 110 to helical gear 114 to drive spur gear 86. Hour tube 110 is secured in a bore 116 in helical gear 114. Minute spindle 112 rotates freely (without function) in bore 116. A threaded support tube 118 (part of clock movement 108 to mount the movement in various clocks) houses hour tube 110. Bracket 82 has two depending flanges 120, 122. An opening in flange 122 receives a stub shaft 124 on helical gear 114 and an opening in flange 120 receives suport tube 118. A nut 126 on support tube 118 secures flange 120 to the housing of clock movement 108.

Clock movement 108 has quartz type action. The clock movement used in the prototype was manufactured by the Japanese firm of Tochigi Tokei Co., Ltd.

The gears 114, 86 are designed to rotate movable part 52 once every twenty-eight days responsive to two complete rotations of hour tube 110 every twenty-four hours. If movable part 52 rotates once every twenty-eight days, inlet port 27 and outlet port 29 communicate for discharge of sodium hypochlorite from vessel 24 every fourteen days when port 29 becomes aligned with through passage 66.

One of the features of my invention is the economy of the equipment used, which is an important consideration in view of the need for a vessel 24, a valve 26, a timed drive 40, etc., for each swimming pool served. For example of costs, clock movement 108 in sizable quantities can be purchased for a price in the three to four dollar range, batteries 109 only need to be changed once a year and therefore involve nominal cost, the cost of electrical connection to household electricity is avoided, etc.

Figures 11, 12, 13:
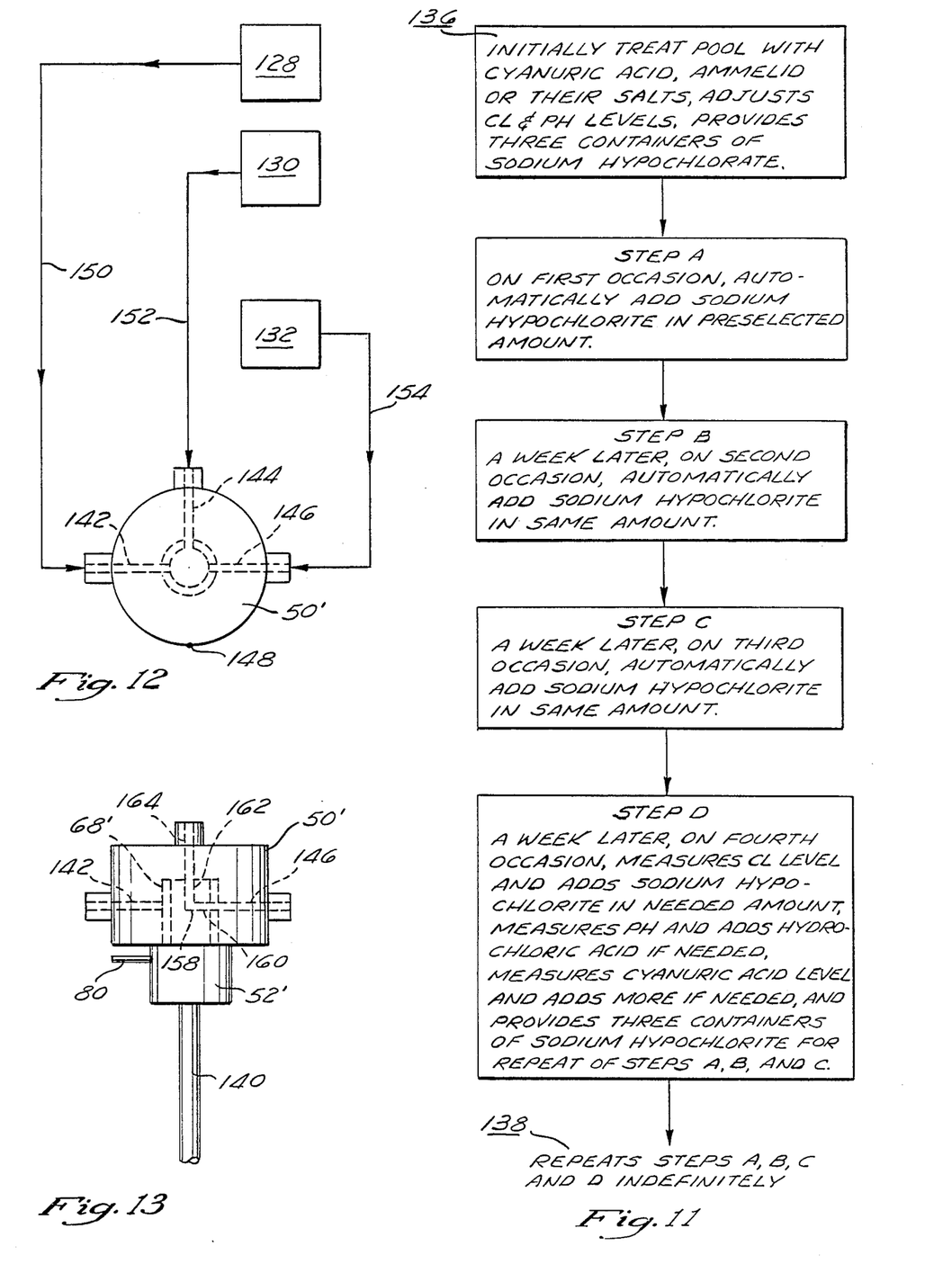
FIG. 11 is a flow diagram showing a modified system for chlorination of a swimming pool.
FIG. 12 is a top view of a modified control valve.
FIG. 13 is a side view of a modified control valve.

FIGS. 11-13 concern a modified system in which sodium hypochlorite is used as the sole source of chlorine for addition to the water of a swimming pool, instead of the use of any gaseous chlorine. Chlorine is more expensive if sodium hypochlorite is used as a source of chlorine than if gaseous chlorine is used as a source of chlorine. There would be two occasions, however, to go to an all sodium hypochlorite system:

(a) If the system saved enough labor in less frequent servicing of the swimming pool as to chlorine level. This depends partly on the wage scale of the swimming pool service attendant.

(b) If a jurisdiction, i.e., city, county, state, etc., outlawed the use of gaseous chlorine because of possibility of environmental or other damage.

Containers 128, 130, 132 in FIG. 11 represent three separate supplies of sodium hypochlorite which could be successively used a certain number of days apart, i.e., a week apart, in which case the cycle, including one manual treatment, would last four weeks. In the system diagrammed in FIG. 11, sodium hypochlorite is added automatically for three weeks or other periods of time and is added manually the fourth week. This would mean that vessels 128, 130, 132 would b needed for three weeks and the supply on the fourth week would be accomplished by service personnel. Of course, a different number of containers and automatic servicing occasions could be elected.

The cycle outlined in FIG. 11 is as follows:

(1) In the initial set up 136, like in step 10 in the FIG. 9 system, treating the pool with cyanuric acid, ammelid or their salts to provide the same level of cyanuric acid, etc., as in step 10. Also, the swimming pool service attendant deposits sodium hypochlorite in three containers 128, 130, 132 each time in an amount calculated to raise the level of chlorine in the swimming pool to preferably about 8 ppm.

(2) In Steps A, B, and C, automatically, preferably a week apart, adding the sodium hypochlorite successively from containers 128, 130, 132.

(3) In Step D, a week after Step C, the swimming pool service attendant measures the chlorine level in the pool and adds sodium hypochlorite in an amount necessary to reach preferably 8 ppm. The attendant also measures the pH and adds hydrochloric acid, if needed, to reach a selected level, i.e., 7.5. The attendant refills the containers 128, 130, 132 emptied in Steps A, B and C.

(4) The subsequent action 138 is to repeat steps A, B, C and D indefinitely.

Essentially the same valve can be used as valve 26 described in connection with FIGS. 1-6, i.e., the same timed drive can be used, the same mounting, etc. The differences are in details of upper stationary part 50 and lower movable or rotatable part 52. In the modified construction of FIGS. 12 and 13, stationary part 50' and rotatable part 52' are adapted to automatically empty three containers 128-132. A rotatable drive shaft 140 is schematically indicated, but, as stated before, the drive, mounting, etc. actually can follow the drive 40, etc., shown in FIGS. 1-6. Upper stationary part is shown as having three radially disposed ports and tube connectors 142, 144, 146 to which containers 128-132 are connected by lines 150, 152, 154. It will be understood that the number of ports 142-146 could be varied according to the radial spacing of these ports, i.e., these ports are separated 90° apart but ports could be separated 120° or 72° apart for examples. The configuration in FIG. 12 is that of a quadrant, i.e., ports 142, 144, 146 are spaced 90° apart and the fourth quadrant point 148 represents the location of leg 160 of L-shaped passage way 158 on the fourth week when the service person comes to manually care for the swimming pool.

Movable or rotatable part 52' is modified from part 52 by having an L-shaped passageway 158 with a horizontal leg 160 that successively becomes aligned with ports 142, 144, 146, and a vertical leg 162. Vertical leg 162 is aligned with a vertical port and tube connector 164 that connects to the input side of the swimming pool recirculating pump. An elastomeric sleeve 68' is like elastomeric sleeve 68 but has only one opening registering with the horizontal leg 160 of L-shaped passageway 158.

Referring back to FIG. 1-6, vessel 24 can be a plastic container or bucket 24 in production for other purposes, so that cost will reflect a mass-produced commodity. The standard lid 166 for bucket 24 is modified by cutting a circular opening 168. Container 42 is preferably a standard plastic commercial container such as is used for food storage in refrigerator or freezer. For mold release, the container sidewalls upwardly flare. This means that circular opening 168 can be sized to fit the diameter of the sidewalls of container 42 midway in their heights, and container 42 will releasably rest in circular opening 168.

Float valve 28 can be secured to the bottom 170 of bucket 24 by providing an opening 172 in bottom 170, a depending, threaded reduced-diameter boss 174 on valve 28, a nut 176 on boss 174 and a sealing washer or O-ring 178 around boss 174.

Float valve 28 includes an upstanding lower member 180 (of which boss 174 is a part) with an upwardly open recess 182. Member 180 has an L-shaped outlet passageway from the bottom of recess 182 and leading to a connector fitting 186 to which tube 31 is connected. Member 180 has a side inlet passageway 188 from said recess 182 spaced above the bottom of recess 182 for inlet of sodium hypochlorite solution from bucket 24.

Float valve 28 has a valve closure member 190 having a depending boss 192 extending down into recess 182. The lower end of boss 192 acts as a valve piece closing outlet passageway 184 in the lowermost position of boss 192. The base of recess 182 has an annular upraised seat 185 against which the lower end of boss 192 seats. Valve closure member 190 has an air-trapping cap 194 with a top wall 196 and side walls 198 defining an air trap. This means that float valve 28 maintains an upper position until the level of sodium hypochlorite solution in bucket 14 reaches a low level so that boss 192 seals passageway 184 whereby the recirculating pump 20 won't draw air through line 31, valve 26, etc.

Lower member 180 and valve closure member 190 are preferably made of PVC but boss 192 or at least the lower part of boss 192 is made of Teflon so as to make a good conforming seal around passageway 184.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. Means to treat a body of water in a swimming pool, comprising:
   (a) a series of vessels containing sodium hypochlorite solution,
   (b) a recirculating line including a pump having an inlet side withdrawing water from said pool and having an outlet side returning the withdrawn water to said pool,
   (c) a valve connected to said recirculating line and a separate delivery line from each vessel to said valve so that sodium hypochlorite solution is withdrawn from each vessel and added to said recirculating line only when said valve connects the associated separate delivery line to said recirculating line, power means operative to operate said valve, said valve having a stationary part and having a movable part rotatably mounted relative to said stationary part and said power means operating to rotate said movable part, and said stationary part and said movable part having a series of fluid passageways at several radially spaced locations serially aligning and operating to permit fluid flow between said separate delivery lines of said series of vessels in each revolution of said movable part to add sodium hypochlorite solution to said body of water in a series of batches separated by time,
   (d) said power means being a standard commercially available type clock motor including a rotarty hour output element achieving rotation at least once every twenty-four hours and said power means including reduction gearing so that said series of fluid passageways only become aligned to serially deliver sodium hypochlorite solution from said series of vessels at intervals spaced a number of days apart,
   (e) said stationary part having a cavity of circular cross-section and said movable part fitting within said cavity and said stationary part having a series of evenly radially spaced inlet ports plus a manual servicing point and each inlet port connecting to one of said delivery lines from said vessels, said movable part having an L-shaped passage having a first leg successively connecting with said inlet ports and said manual servicing point as said movable part rotates and the second leg of said L-shaped passage being aligned with the axis of rotation of said movable part and said stationary part having an outlet port aligned with said axis of rotation and connecting to said second leg of said L-shaped passage, said outlet port connecting to said recirculating line, and
   (f) an elastomeric sleeve interposed between said stationary part and said movable part and said movable part and said sleeve being joined by an annular groove in one and a mating annular bead on the other.

2. Means to treat a body of water in a swimming pool comprising:
   (a) a series of vessels containing sodium hypochlorite solution,
   (b) a recirculating line including a pump having an inlet side withdrawing water from said pool and having an outlet side returning the withdrawn water to said pool,
   (c) a valve connected to said recirculating line and a separate delivery line from each vessel to said valve so that sodium hypochlorite solution is withdrawn from each vessel and added to said recirculating line only when said valve connects the associated separate delivery line to said recirculating line, power means operative to operate said valve, said valve having a stationary part and having a movable part rotatably mounted relative to said stationary part and said power means operating to rotate said movable part, and said stationary part and said movable part having series of fluid passageways at several radially spaced locations serially aligning and operating to permit fluid flow between said separate delivery lines of said series of vessels in each revolution of said movable part to add sodium hypochlorite solution to said body of water in a series of batches separated by time.
   (d) said power means being a standard commercially available type clock motor including a rotary hour output element achieving rotation at least once every twenty-four hours and said power means including reduction gearing so that said series of fluid passageways only become aligned to serially deliver sodium hypochlorite solution from said series of vessels at intervals spaced a number of days apart, and
   (e) the delivery line from each vessel connecting to a float valve in the bottom of said vessel, said float valve including an upstanding member with an upwardly open recess, said upstanding member having an outlet passageway from the bottom of said recess connecting to said delivery line and having a side inlet passageway from said recess spaced above the bottom of said recess whereby sodium hypochlorite solution can pass from said vessel through said inlet passageway through said recess and through said outlet passageway to said delivery line, and a valve closure member having a depending boss extending down into said recess, the lower end of said boss acting as a valve piece closing said outlet passageway in the lowermost position of said boss, said valve closure member having an air-trapping cap with top and side walls defining an air trap and said boss depending centrally from said cap whereby said valve closure member maintains an upper position until the level of sodium hypochlorite solution in each vessel reaches a low level so that said boss presses against said outlet passageway to seal the same.

3. Means to treat a body of water in a swimming pool, comprising:
(a) a vessel containing sodium hypochlorite solution,
(b) a recirculating line including a pump having an inlet side withdrawing water from said pool and having an outlet side returning the withdrawn water to said pool,
(c) a feeder line from said vessel to said recirculating line and a valve acting on said feeder line so that sodium hypochlorite solution is withdrawn from said vessel and added to said recirculating line only when said valve is open, power means operative to open and close said valve, said valve having a stationary part and having a movable part rotatably mounted relative to said stationary part and said power means operating to rotate said movable part, and said stationary part and said movable part having fluid passageways aligning and operative to permit fluid flow through said feeder line at least once in each revolution of said movable part for addition of sodium hypochlorite solution to said body of water,
(d) said power means being a standard commercially available type clock motor including a rotary hour output element achieving rotation at least once every twenty-four hours and said power means including reduction gearing so that said fluid passageway align to permit fluid flow at intervals spaced a number of days apart, and
(e) the feeder line from said vessel connecting to a float valve in the bottom of said vessel, said float valve including a upstanding member with an upwardly open recess, said upstanding member having an outlet passageway from the bottom of said recess connecting to said feeder line and having a side inlet passageway from said recess spaced above the bottom of said recess whereby sodium hypochlorite solution can pass from said vessel through said inlet passageway through said recess and through said outlet passageway to said feeder line, and a valve closure member having a depending boss extending down into said recess, the lower end of said boss acting as a valve piece closing said outlet passageway in the lowermost position of said boss, said valve closure member having an air-trapping cap with top and side walls defining an air trap and said boss depending centrally from said cap whereby said valve closure member maintains an upper position until the level of sodium hypochlorite solution in said vessel reaches a low level so that said boss presses against said outlet passageway to seal the same.

4. Means to treat a body of water in a swimming pool, comprising:
(a) a vessel containing sodium hypochlorite solution,
(b) a recirculating line including a pump having an inlet side withdrawing water from said pool and having an outlet side returning the withdrawn water to said pool,
(c) a valve connected to said recirculating line and a delivery line from said vessel to said valve which acts on said delivery line so that sodium hypochlorite solution is withdrawn from said vessel and added to said recirculating line only when said valve is open, power means operative to open and close said valve, said valve having a stationary part and having a movable part rotatably mounted relative to said stationary part and said power means operating to rotate said movable part at a speed no faster than at least one week for each rotation and said stationary part and said movable part having fluid passageways aligning and operative to permit fluid flow through said delivery line at least once in each revolution of said movable part, and said valve permitting addition of sodium hypochlorite solution to said body of water at intervals spaced a number of days apart,
(d) said stationary part having a cavity of circular cross-section and said movable part fitting within said cavity and said stationary part having a pair of diametrically opposed ports, one being an inlet port connecting to said delivery line and the other being an outlet port and connecting to said recirculating line, said movable part having a through passage aligning with said diametrically opposed port twice in each rotation of said movable part, so that sodium hypochlorite solution will be discharged from said vessel each time said through passage aligns with said diametrically opposed ports, and
(e) an elastomeric sleeve interposed between said stationary part and said movable part, and said movable part and said sleeve being joined by an annular groove in one and a mating annular bead on the other.

5. Means to treat a body of water in a swimming pool, comprising:
(a) a vessel containing sodium hypochlorite solution,
(b) a recirculating line including a pump having an inlet side withdrawing water from said pool and having an outlet side returning the withdrawn water to said pool,
(c) a valve connected to said recirculating line and a delivery line from said vessel to said valve which acts on said delivery line so that sodium hypochlorite solution is withdrawn from said vessel and added to said recirculating line only when said valve is open, power means operative to open and close said valve, said valve having a stationary part and having a movable part rotatably mounted relative to said stationary part and said power means operating to rotate said movable part at a speed no faster than at least one week for each rotation and said stationary part and said movable part having fluid passageways aligning and operative to permit fluid flow through said delivery line at least once in each revolution of said movable part, and said valve permitting addition of sodium hypochlorite solution to said body of water at intervals spaced a number of days apart, and
(d) the delivery line from said vessel connecting to a float valve in the bottom of said vessel, said float valve including an upstanding member with an upwardly open recess, said upstanding member having an outlet passageway from the bottom of said recess connecting to said delivery line and having a side inlet passageway from said recess spaced above the bottom of said recess whereby sodium hypochlorite solution can pass from said vessel through said inlet passageway through said recess and through said outlet passageway to said delivery line, and a valve closure member having a depending boss extending down into said recess, the lower end of said boss acting as a valve piece closing said outlet passageway in the lowermost position of said boss, said valve closure member having an air-trapping cap with top and side walls defining an air trap and said boss depending centrally from said cap whereby said valve closure member maintains an upper position until the level of sodium hypochlorite solution in said vessel reaches a low level so that said boss presses against said outlet passageway to seal the same.

6. Means to treat a body of water in a swimming pool comprising:
   (a) a series of separate vessels and an equal quantity of sodium hypochlorite solution in each vessel, each quantity being an amount adequate to treat said body of water in said swimming pool on one occasion,
   (b) a recirculating line including a pump having an inlet side withdrawing water from said pool and having an outlet side returning the withdrawn water to said pool,
   (c) a valve located at a level below the bottoms of said vessels, said valve being connected to said recirculating line, a separate delivery line from each vessel operative to dump the complete contents of the respective vessel to said valve by gravity flow so that the sodium hypochlorite solution from each vessel is completely withdrawn and added to said recirculating line when said valve connects the associated separate delivery line to said recirculating line, power means operative to operate said valve, said valve having a stationary part and having a movable part rotatably mounted relative to said stationary part and said power means operating to rotate said movable part, and said stationary part and said movable part having a series of fluid passageways at several radially spaced locations serially aligning and operating to completely dump the sodium hypochlorite solution in each vessel through the associated separate delivery line and through the associated fluid passageway in each revolution of said movable part by said power means thereby adding sodium hypochlorite solution to said body of water in an amount contained by each vessel in a series of batches separated by time,
   (d) said power means being a standard commercially available type clock motor including a rotary hour output element and including means rotating said output element once every twelve hours and said power means including reduction gearing connected to said rotary hour output element with such reduction that said series of fluid passageways only become aligned with the associated separate delivery lines to serially deliver sodium hypochlorite solution from said series of vessels at intervals spaced a week apart, and said power means including a standard commercially available battery powering said motor by direct current, and
   (e) said stationary part having a cavity of circular cross-section and said movable part fitting within said cavity, said stationary part having a series of evenly radially spaced inlet ports plus a manual servicing point and each inlet port connecting to one of said delivery lines from said vessels, said movable part having an L-shaped passage having a first leg successively aligning with said inlet ports and said manual servicing point as said movable part rotates and the second leg of said L-shaped passage being aligned with the axis of rotation of said movable part and said stationary part having an outlet port aligned with said axis of rotation and connecting to said second leg of said L-shaped passage, said outlet port connecting to said recirculating line.

7. Means to treat a body of water in a swimming pool comprising:
   (a) a series of separate vessels and an equal quantity of sodium hypochlorite solution in each vessel, each quantity being an amount adequate to treat said body of water in said swimming pool on one occasion,
   (b) a recirculating line including a pump having an inlet side withdrawing water from said pool and having an outlet side returning the withdrawn water to said pool,
   (c) a valve located at a level below the bottoms of said vessels, said valve being connected to said recirculating line, a separate delivery line from each vessel operative to dump the complete contents of the respective vessel to said valve by gravity flow so that the sodium hypochlorite solution from each vessel is completely withdrawn and added to said recirculating line when said valve connects the associated separate delivery line to said recirculating line, power means operative to operate said valve, said valve having a stationary part and having a movable part rotatably mounted relative to said stationary part and said power means operating to rotate said movable part, and said stationary part and said movable part having a series of fluid pasageways at several radially spaced locations serially aligning and operating to completely dump the sodium hypochlorite solution in each vessel through the associated separate delivery line and through the associated fluid passageway in each revolution of said movable part by said power means thereby adding sodium hypochlorite solution to said body of water in an amount contained by each vessel in a series of batches separated by time,
   (d) said power means being a standard commercially available type clock motor including a rotary hour output element and including means rotating said output element once every twelve hours and said power means including reduction gearing connected to said rotary hour output element with such reduction that said series of fluid passageways become aligned with the associated separate delivery lines to serially deliver sodium hypochlorite solution from said series of vessels at intervals spaced a week apart, and said power means including a standard commercially available battery powering said motor by direct current.

8. Means to treat a body of water in a swimming pool comprising:
   (a) a series of separate vessels and an equal quantity of sodium hypochlorite solution in each vessel, each quantity being an amount adequate to treat said body of water in said swimming pool on one occasion, (b) a recirculating line including a pump having an inlet side withdrawing water from said pool and having an outlet side returning the withdrawn water to said pool, (c) a valve located at a level below the bottoms of said vessels, said valve being connected to said recirculating line, a separate delivery line from each vessel operative to dump the complete contents of the respective vessel to said valve by gravity flow so that the sodium hypochlorite solution from each vessel is completely withdrawn and added to said recirculating line when said valve connects the associated separate delivery line to said recirculating line, power means operative to operate said valve, said valve having a stationary part and having a movable part rotatably mounted relative to said stationary part and said power means operating to rotate said movable part, and said stationary part and said movable part having a series of fluid passageways at several radially spaced locations serially aligning and operating to completely dump the sodium hypochlorite solution in each vessel through the associated separate delivery line and through the associated fluid passageway in each revolution of said movable part by said power means thereby adding sodium hypochlorite solution to said body of water in an amount contained by each vessel in a series of batches separated by time, (d) said power means being a standard commercially available type clock motor including a rotary hour output element and including means rotating said output element at least once every twelve hours and said power means including reduction gearing connected to said rotary hour output element with such reduction that said series of fluid passageways only become aligned with the associated separate delivery lines to serially deliver sodium hypochlorite solution from said series of vessels at intervals spaced a number of days apart, and said power means including a standard commercially available battery powering said motor by direct current.

9. Means to treat a body of water in a swimming pool, comprising:

(a) a vessel and a quantity of sodium hypochlorite solution in said vessel in an amount adequate to treat said body of water in said swimming pool on one occasion, (b) a recirculating line including a pump having an inlet side withdrawing water from said pool and having an outlet side returning the withdrawn water to said pool, (c) a feeder line extending downwardly from said vessel to said recirculating line and a valve located at a level below said vessel acting on said feeder line so that said quantity of sodium hypochlorite solution is completely dumped by gravity flow from said vessel and added to said recirculating line when said valve is opened, power means operative to open and close said valve, said valve having a stationary part of circular cross-section and having a movable part rotatably fitted within said stationary part and said power means operating to rotate said movable part, and said stationary part having a pair of diametrically opposed ports, one being an inlet port connected to said feeder line and the other being an outlet port connected to said recirculating line and said movable part having a through passage aligning with said diametrically opposed ports and operative to permit fluid flow through said feeder line upon such alignment at a point in the revolution of said movable part so that said quantity of sodium hypochlorite solution will be discharged into said body of water, and (d) said power means being a standard commercially available type clock motor including a rotary hour output element and including means rotating said output element once every twelve hours and said power means including reduction gearing connecting to said output element and having such reduction that said fluid passageways align to permit fluid flow at intervals spaced fourteen days apart, and said power means including a standard commercially available battery powering said motor by direct current.

10. Means to treat a body of water in a swimming pool, comprising:

(a) a vessel and a quantity of sodium hypochlorite solution in said vessel in an amount adequate to treat said body of water in said swimming pool on one occasion, (b) a recirculating line including a pump having an inlet side withdrawing water from said pool and having an outlet side returning the withdrawn water to said pool, (c) a feeder line extending downwardly from said vessel to said recirculating line and a valve located at a level below said vessel acting on said feeder line so that said quantity of sodium hypochlorite solution is completely dumped by gravity flow from said vessel and added to said recirculating line when said valve is opened, power means operative to open and close said valve, said valve having a stationary part and having a movable part rotatably mounted relative to said stationary part and said power means operating to rotate said movable part, and said stationary part and said movable part having fluid passageways aligning and operative to permit fluid flow through said feeder line at least once in each revolution of said movable part for addition of sodium hypochlorite solution to said body of water, and (d) said power means being a standard commercially available type clock motor including a rotary hour output element and including means rotating said output element at least once every twenty-four hours and said power means including reduction gearing connecting to said output element and having such reduction that said fluid passageways align to permit fluid flow at intervals spaced a number of days apart, and said power means including a standard commercially available battery powering said motor by direct current.

11. Means to treat a body of water in a swimming pool, comprising:

(a) a bucket and a quantity of sodium hypochlorite solution in said bucket in an amount adequate to treat said body of water in said swimming pool on one occasion, (b) a recirculating line including a pump having an inlet side withdrawing water from said pool and having an outlet side returning the withdrawn water to said pool, (c) a feeder line connecting to said recirculating line at one end having its other end disposed to withdraw said quantity of sodium hypochlorite solution by gravity flow from the lower portion of said bucket, (d) a valve located at a level below said bucket interposed in said feeder line dumping said quantity of sodium hypochlorite solution from said bucket to said recirculating line when said valve is opened, (e) mounting means for said valve including a container with a removable container top and said valve being secured to said container top, said container top having an opening therein and a drive shaft extending through said opening, a standard commercially available type clock motor disposed in said container including a rotary hour output element and including means rotating said output element, and reduction gearing connected to said output element and to said drive shaft whereby said drive shaft rotates responsive to the rotation of said output element at a reduced rotational rate, a standard commercially available battery disposed in said container powering said clock motor by direct current, said clock motor, reduction gearing and battery being protected by being contained in said container, (f) said valve having a rotable annular part attached to the upper end of said drive shaft, said valve having a stationary part with a downwardly open annular cavity into which said rotatable part is fitted, said stationary part having inlet and outlet ports to which said feeder line is connected and said rotatable part having a passageway communicating between said inlet and outlet ports at a point in the rotation of said rotatable part by said drive shaft, whereby said quantity of sodium hypochlorite solution is dumped to said recirculation line when said passageway is aligned with said inlet and outlet ports, and (g) said bucket being made of plastic and having a plastic top with a circular opening therein, said container flaring from bottom to top and the central portion of said container fitting in said circular opening.

* * * * *